(12) United States Patent
Huang et al.

(10) Patent No.: US 8,223,846 B2
(45) Date of Patent: Jul. 17, 2012

(54) LOW-COMPLEXITY AND HIGH-QUALITY ERROR CONCEALMENT TECHNIQUES FOR VIDEO SEQUENCE TRANSMISSIONS

(75) Inventors: Shih-Chia Huang, Taipei (TW); Sy-Yen Kuo, Taipei (TW)

(73) Assignee: National Taiwan University, Taipei (TW)

( * ) Notice: Subject to any disclaimer, the term of this patent is extended or adjusted under 35 U.S.C. 154(b) by 929 days.

(21) Appl. No.: 12/262,181

(22) Filed: Oct. 31, 2008

(65) Prior Publication Data

US 2010/0002775 A1 Jan. 7, 2010

(30) Foreign Application Priority Data

Jul. 3, 2008 (TW) .............................. 97125080 A

(51) Int. Cl.
*H04N 7/12* (2006.01)
(52) U.S. Cl. .......... 375/240.24; 375/240.27; 375/240.26
(58) Field of Classification Search .................. None
See application file for complete search history.

(56) References Cited

U.S. PATENT DOCUMENTS

| 8,116,383 B2* | 2/2012 | Kuo et al. ............... 375/240.27 |
| 2010/0002771 A1* | 1/2010 | Huang et al. ............ 375/240.16 |
| 2010/0040153 A1* | 2/2010 | Imanaka et al. ......... 375/240.24 |
| 2010/0150253 A1* | 6/2010 | Kuo et al. ............... 375/240.27 |
| 2010/0303370 A1* | 12/2010 | Yamori et al. ........... 375/240.16 |

OTHER PUBLICATIONS

Shih-Chia Huang and Sy-Yen Kuo, "Temporal Error Concealment for H.264 Using Optimum Regression Plane", The 14th International Multimedia Modeling Conference, Jan. 9-11, 2008, Kyoto University, Japan.

Yanling Xu and Yuanhua Zhou, "H.264 Video Communication Based Refined Error Concealment Schemes", IEEE Transactions on Consumer Electronics, vol. 50, No. 4, Nov. 2004, p. 1135-1141.

Zhou Wang, Yinglin Yu and David Zhang, "Best Neighborhood Matching: An Information Loss Restoration Technique for Block-Based Image Coding Systems", IEEE Transactions on Image Processing, vol. 7, No. 7, Jul. 1998, p. 1056-1061.

Huifang Sun and Wilson Kwok, "Concealment of Damaged Block Transform Coded Images Using Projections onto Convex Sets", IEEE Transactions on Image Processing, vol. 4, No. 4, Apr. 1995, p. 470-477.

* cited by examiner

*Primary Examiner* — David Y Jung
(74) *Attorney, Agent, or Firm* — Jianq Chyun IP Office

(57) ABSTRACT

A spatial error concealment (SEC) method for concealing a spatial image error of an encoded image frame caused by a damaged macroblock (MB) is provided. The SEC method selects a proper SEC algorithm by adaptively classifying a plurality of correct MBs adjacent to the damaged MB, so as to execute interpolation pixel compensation or matching block copying, thus obtaining image data of the damaged MB. In such a way, the damaged MB is processed to apply the least affection to the entire image frame. The SEC algorithm is selected from bilinear interpolation (BI) method, directional interpolation (DI) method, multi-directional interpolation (MDI) method, and best neighborhood matching (BNM) method. The SEC method further includes a fast determination calculation, which utilizes image directional data related to the damaged MB in coding data of the original frame to execute a direct SEC process, for saving time on determination calculation, thus accelerating the processing speed.

10 Claims, 9 Drawing Sheets

LOW-COMPLEXITY AND HIGH-QUALITY ERROR CONCEALMENT TECHNIQUES FOR VIDEO SEQUENCE TRANSMISSIONS

BACKGROUND OF THE INVENTION

1. Field of the Invention

The present invention relates generally to a low-complexity and high-quality error concealment techniques for video sequence transmissions, and more particularly, to a spatial error concealment (SEC) method for concealing a spatial image error of an encoded image frame caused by damaged macroblocks (MB).

2. The Prior Arts

Image transmission service including video meeting, website browsing, image file transmission, is a very important service provided by communication and IT enterprises. Typically, an original image file desired to be transmitted is often too large to be effectively transmitted over the internet, or often occupies too much memory space. As such, an image file is often performed with a coding process with a high compression ratio and a low loss ratio before transmission for reducing the size of the image content. Such a coding process may be selected from TIFF, JPEG, MJEP, MPEG, H.264/AVC, in accordance with the demands of the system for the image compression ratio, the loss ratio, so as to obtain an optimal algorithm for static images or continuous images.

However, when being transmitted, the encoded image file is often interfered by the transmission interface or the electrical system of the receiving end. Such interferences usually cause damages or errors of the image file content, so that the receiving end becomes incapable of decoding and recovering the encoded image file back to original by a predetermined corresponding decoding method.

In accordance with psychology of vision, an individual edge would not affect visional recognition. However, such an individual edge may be mutually affected with edges adjacent thereto so as to generate a composition effect. In this concern, human vision is more sensitive to edge distortions. Generally, edge distortions include blurred edges and newly created false edges. As such, it is very important to maintain original edges and avoid the creation of false edges when executing an image process.

A method of recovering or obtaining image content of a damaged MB according to image content of correct MBs of a same frame of the damaged MB is generally called the SEC method.

There are many algorithms of conventional technologies have been proposed for SEC, such as bilinear interpolation (BI), directional interpolation (DI), and best neighborhood matching (BNM). The principles of the aforementioned algorithms can be learnt in more details by referring to related references, such as: P. Salama, N. B. Shroff, and E. J. Delp, "Error concealment in encoded video streams," in Signal Recovery Techniques for Image and Video Compression and Transmission, A. K. Katsaggelos and N. P. Galatsanos, Eds. Norwell, M A: Kluwer, ch. 7, 1998; H. Sun and W. Kwok, "Concealment of damaged block transform coded images using projection onto convex set," IEEE Trans. Image Processing, vol. 4, pp. 470-477, April 1995; and Z. Wang, Y. Yu, and D. Zhang, "Best neighborhood matching: An information loss restoration technique for block-based image coding systems," IEEE Trans. Image Process., vol. 7, no. 7, pp. 1056-1061, July 1998. They are to be briefly illustrated hereinbelow for better exemplification of the present invention.

FIG. 1 is a schematic diagram illustrating a BI method according to a conventional technology. Referring to FIG. 1, a damaged MB 20 having no correct image content is surrounded by edge reference pixels 21 containing correct image content. A missing pixel P(x, y) in the damaged MB 20 positioned at the coordinates (x, y) of BI is then interpolated by the formula (1), according to the correct image content of the four edges in both horizontal direction and vertical direction:

$$p(x, y) = \frac{p1 \times d2 + p2 \times d1 + p3 \times d4 + p4 \times d3}{d1 + d2 + d3 + d4}, \quad (1)$$

in which d1, d2, d3, d4 are relative distances from the edge pixels P1, P2, P3, P4 to the missing pixel P(x, y), respectively.

FIG. 2 is a schematic diagram illustrating a DI method according to a conventional technology. As shown in FIG. 2, the edge pixels contain correct image content, while the MB surrounded by the edge pixels is a damaged MB containing incorrect image content. The pixel P(x, y) in the damaged MB positioned at the coordinates (x, y) is then interpolated by the formula (2), according to the correct image content of two edges along a specific direction:

$$p(x, y) = \frac{p1 \times d1 + p2 \times d2}{d1 + d2}, \quad (2)$$

in which d1, d2 are relative distances from the edge pixels P1, P2, to the missing pixel P(x, y), respectively.

FIG. 3 is a directional schematic diagram illustrating a DI method according to a conventional technology. As shown in FIG. 3, in the DI method, the edge direction is classified into 8 directions, in which DI(0°) represents a direction of 0°, DI(22.5°) represents a direction of 22.5°, ... and so forth. P1 and P2 of FIG. 2 are each of one of the 8 directions.

DI method usually employs a direction filter of an edge direction detection technique for determining direction of each pixel contained in the MBs surrounding the damaged MB. Sobel operator or Prewitt operator are often used. Sobel operator, which is also known as a Sobel filter, is to be exemplified for illustration below taking a 3×3 Sobel operator as an example:

$$S_x = \begin{bmatrix} -1 & 0 & 1 \\ -2 & 0 & 2 \\ -1 & 0 & 1 \end{bmatrix} S_y = \begin{bmatrix} -1 & -2 & -1 \\ 0 & 0 & 0 \\ 1 & 2 & 1 \end{bmatrix} \quad (3)$$

in which Sx and Sy detect edge characteristics at X direction and Y direction, respectively, and obtain directional gradients at X direction and Y direction of equation (4) ($G_x$ and $G_y$), respectively.

$$G_x = X_{i+1,j-1} - X_{i-1,j-1} + 2X_{i+1,j} - 2X_{i-1,j} + X_{i+1,j+1} - X_{i-1,j+1}$$

$$G_y = X_{i-1,j+1} - X_{i-1,j-1} + 2X_{i,j+1} - 2X_{i,j-1} + X_{i+1,j+1} - X_{i-1,j-1} \quad (4).$$

A directional gradient (Grand) and a directional angle (θ) can be further calculated with equations (5) and (6).

$$\text{Grand} = \sqrt{G_x^2 + G_y^2} \quad (5)$$

$$\theta = \tan^{-1}(Gx/Gy) \quad (6)$$

in which the directional gradient (Grand) is a quantity factor for evaluating the strength of the directivity. In other words, a directional angle (θ) having a maximum directional gradient (Grand) is selected serving as a direction reference for the damaged MB.

If all of the directional gradients (Grand) are too low, or even lower than a threshold, the damaged MB is determined as having no directivity, and not adapted for SEC by DI method. As such, other methods, (e.g., BI method), are demanded for processing those damaged MBs having no directivity.

FIG. 4 is a schematic diagram illustrating a BNM method according to a conventional technology. Referring to FIG. 4, a damaged MB 20 of frame 40 is surrounded by a plurality of reference MBs 22, and a best matching MB 32 is surrounded by a plurality of target MBs 30 in a searching area 42. The BNM method is for finding out the best matching MB 32 for replacing the damaged MB 20. The BNM method includes the steps of: (1) taking N-pixel-wide boundary surrounding the damaged MB as a searching image; (2) identifying best matching MBs nearest to the damaged MB; and (3) replacing the corresponding damaged MB (i.e., the MB surrounded by the best matching MBs) with the identified best matching MB.

Features of the BI method, ID method, and BNM method are to be discussed below in further details.

The DI method has the advantages of edge protection. For example, if there is only one strong edge near the damaged MB, the original strong edge can be preserved and avoided from becoming blur. However, when there are several edges near the damaged MB, the DI method may generate several false edges. Unfortunately, human vision is usually very sensitive to blur false edges. Correspondingly, the BI method is adapted to generate new blur false edges. However, if there is only one strong edge near the damaged MB, the BI method may blur the original strong edge because the edges of the damaged MB are interpolation processed and mixed with the adjacent pixels. Further, with respect to damaged MBs having patterns of higher complexity, it is often difficult to obtain necessary effective reference blocks. Although the BNM method can recover the complex damaged MB, it may cause edge discontinuity. It may also cause higher computation complexity than BI and DI methods, and thus is featured with a lower overall efficiency.

As such, an efficient SEC method which is adapted for preserving original edges while avoiding generation of new false edges, and can be conducted with less calculation amount, is desired.

SUMMARY OF THE INVENTION

A primary objective of the present invention is to provide a spatial error concealment (SEC) method for concealing a spatial image error of an encoded image frame caused by a damaged macroblock (MB). The SEC method selects a proper SEC algorithm by adaptively classifying a plurality of correct MBs adjacent to the damaged MB, so as to execute interpolation pixel compensation or matching block copying, thus obtaining image data of the damaged MB. In such a way, the damaged MB is processed to apply the least affection to the entire image frame. The SEC algorithm is selected from bilinear interpolation (BI) method, directional interpolation (DI) method, multi-directional interpolation (MDI) method, and best neighborhood matching (BNM) method.

A further objective of the present invention is to provide a SEC method. The SEC method includes a fast determination calculation, which utilizes image directional data related to the damaged MB in coding data of the original frame to execute a direct SEC process, for saving time on determination calculation, thus accelerating the processing speed.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENT

The accompanying drawings are included to provide a further understanding of the invention, and are incorporated in and constitute a part of this specification. The drawings illustrate embodiments of the invention and, together with the description, serve to explain the principles of the invention.

The present invention provides a spatial error concealment (SEC) method, adapted for preserving multiple original edges, without generating new false edges. The SEC method is also featured of a low calculation amount and a short calculation time.

Figure 1:
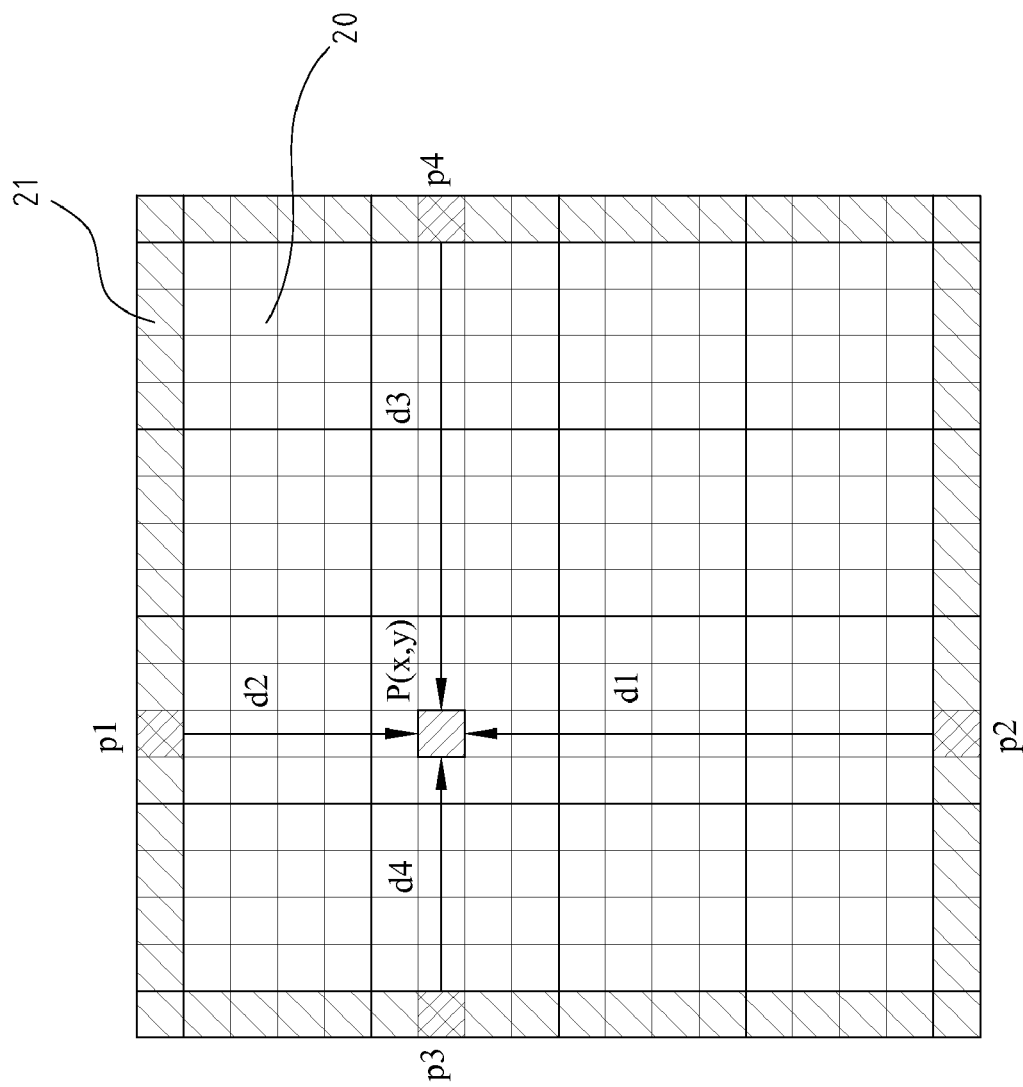
FIG. 1 is a schematic diagram illustrating a BI method according to a conventional technology.
Figure 2:
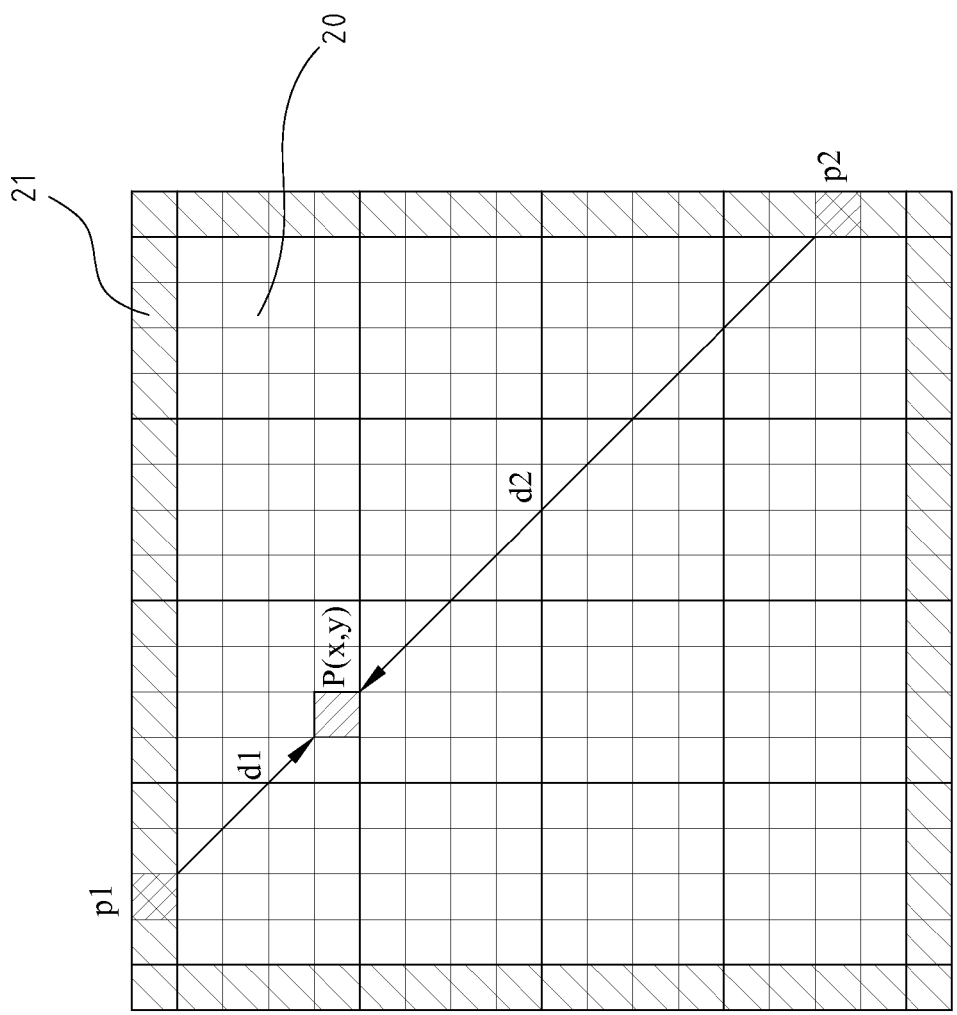
FIG. 2 is a schematic diagram illustrating a DI method according to a conventional technology.
Figure 3:
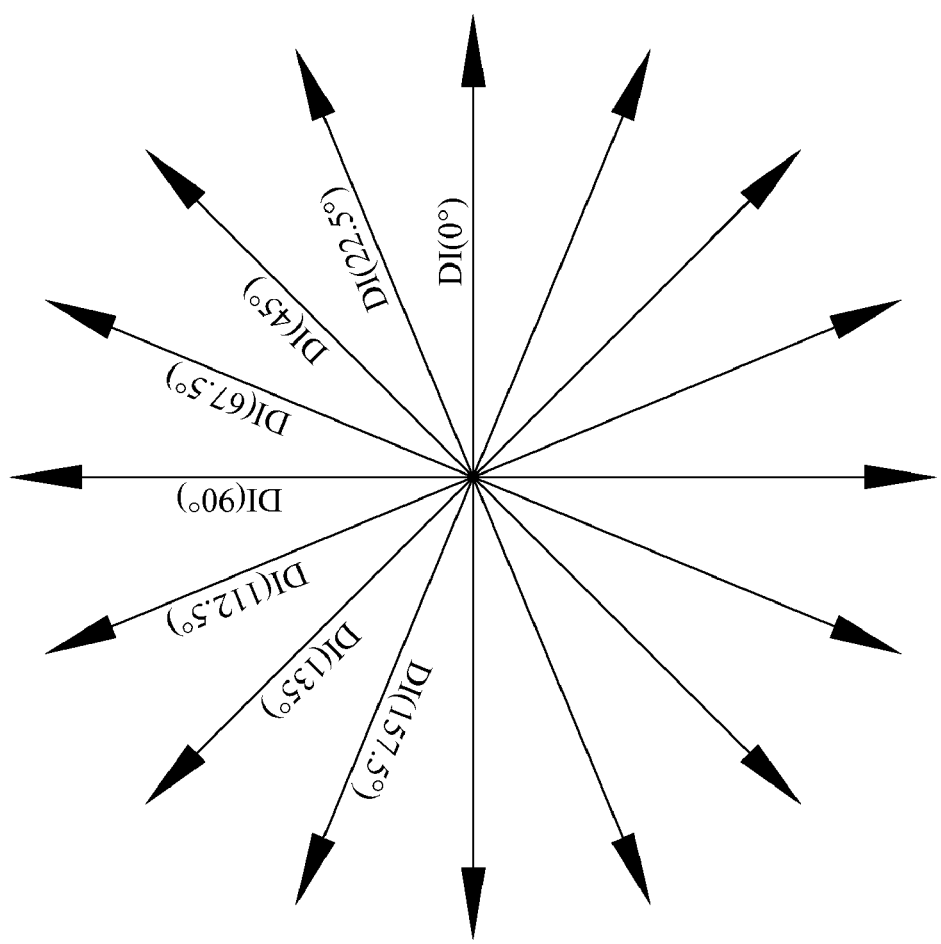
FIG. 3 is a directional schematic diagram illustrating a DI method according to a conventional technology.
Figure 4:
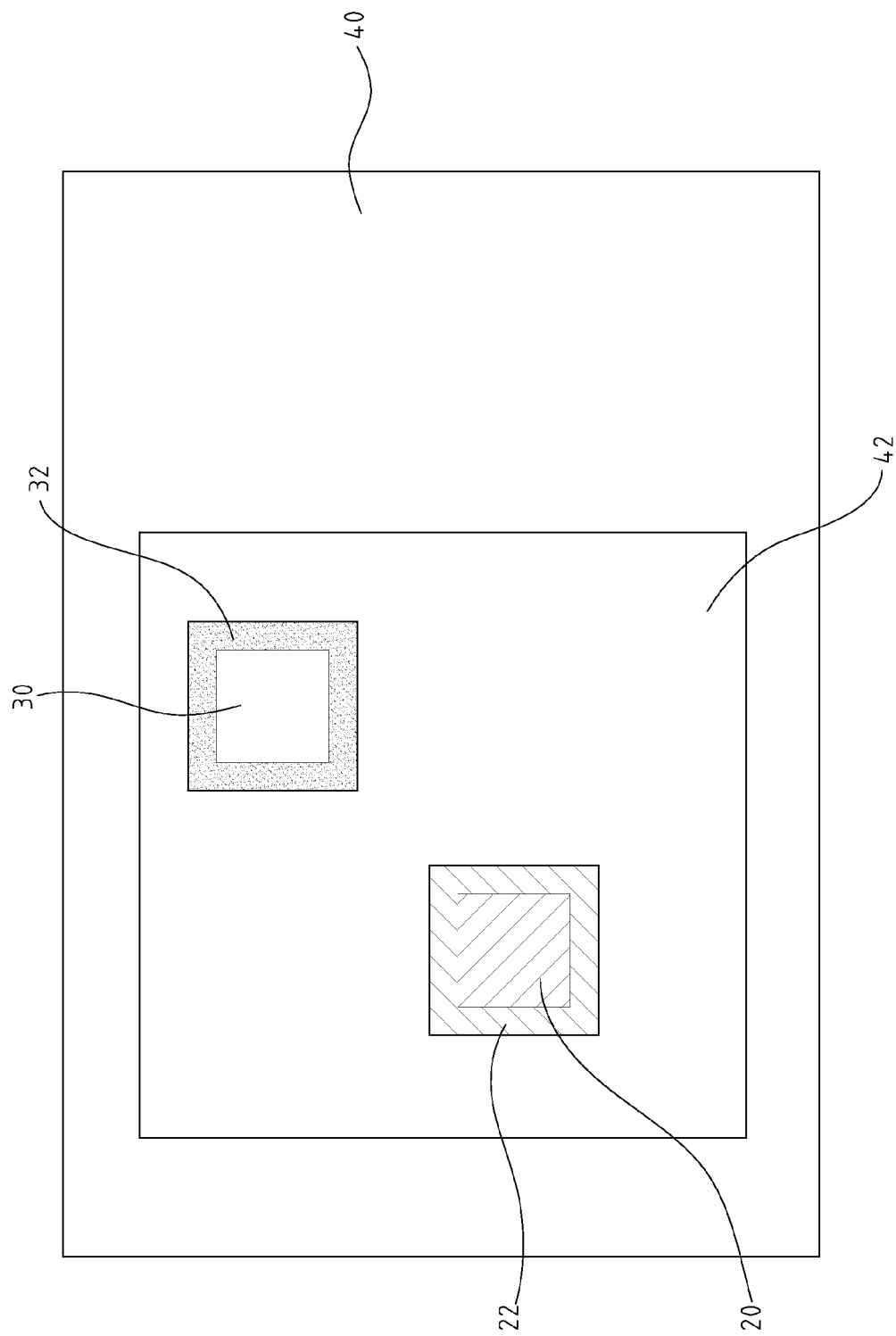
FIG. 4 is a schematic diagram illustrating a BNM method according to a conventional technology.
Figure 5:
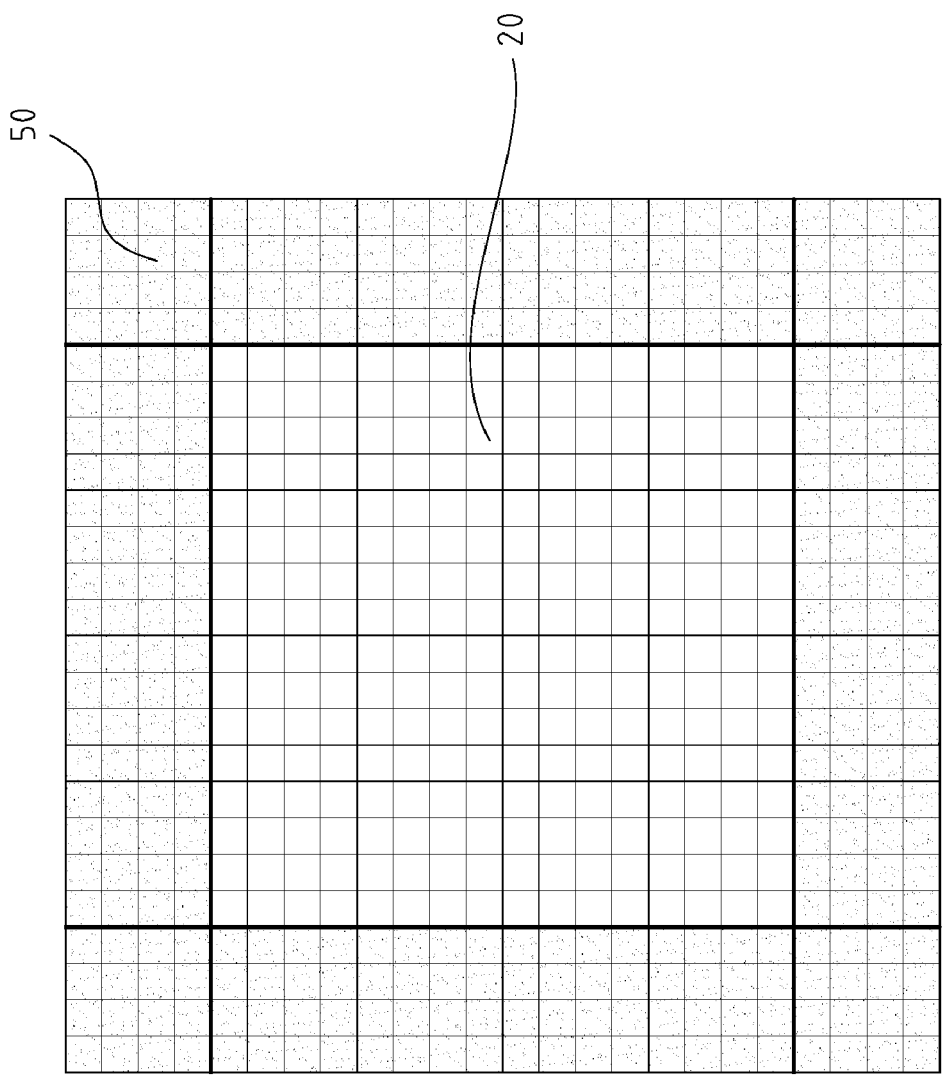
FIG. 5 is a schematic diagram illustrating reference blocks of an MDI method according to an embodiment of the present invention.

FIG. 5 is a schematic diagram illustrating reference blocks of a multi-direction interpolation (MDI) method according to an embodiment of the present invention. Referring to FIG. 5, the SEC method according to the embodiment of the present invention selects a plurality of N-pixel-wide boundary reference blocks 50 as a reference block group surrounding a damaged macroblock (MB) 20. It should be noted that although a 4×4 block is shown in the drawing for illustration purpose, it is not for limit the scope of the present invention, and it should be construed as representing an N×N block.

First, a Sobel operator is used to calculate a directional strength (directional gradient) and a directional angle of individual pixels of the 4×4 reference block as of the DI method. And then, a directional entropy (DE) $H_d$ is calculated according to equation (7) for representing a directional factor.

$$H_d = -\Sigma p(d_x) \log_2 p(d_x) \quad (7),$$

in which $d_x$ represents a directional angle of a specific pixel of the reference block, while $p(dx)$ represents a directional probability density function related to the directional angle.

A greater DE indicates a smaller directivity (i.e., having no specific edge direction), while a maximum DE value (i.e., 1) indicates absolutely evenly distributed edge directions.

Then, a direction threshold β is calculated according to equation (8), for obtaining an overall direction index of the 4×4 reference block. Thus the overall direction index can be accorded to determine whether to adopt the directional angle of the reference block as the directional angle of the damaged MB group.

$$\beta = \frac{-\sum p(d_x) \log_2 p(d_x)}{\text{Max}(H_d)}, \quad (8)$$

in which $\text{Max}(H_d)$ represents a maximum value of $H_d$.

Only when the direction threshold β is smaller than a specific threshold determining value, the present invention adopts the directional angle, and when the direction threshold β is greater than the specific threshold determining value, the damaged MB is determined as having no specific directivity. According to an aspect of the embodiment, the direction threshold β is preferably defined between 0.7 and 0.9. as such, the reference block group can be classified into four categories according to the direction threshold β, including no-directional background area, single-directional edge area, multi-directional edge area, and complex multi-directional edge area. With respect to reference blocks of different categories, different interpolation methods or matching methods are employed for recovering the damaged MB. Specifically, the BI method is applied to the no-directional background area; the DI method is applied to the single-directional edge area; the BNM method is applied to the multi-directional edge area; and the MDI method is applied to the complex multi-directional edge area. Applications of the methods to the reference blocks of different categories are to be discussed in more details herebelow.

Figure 6:
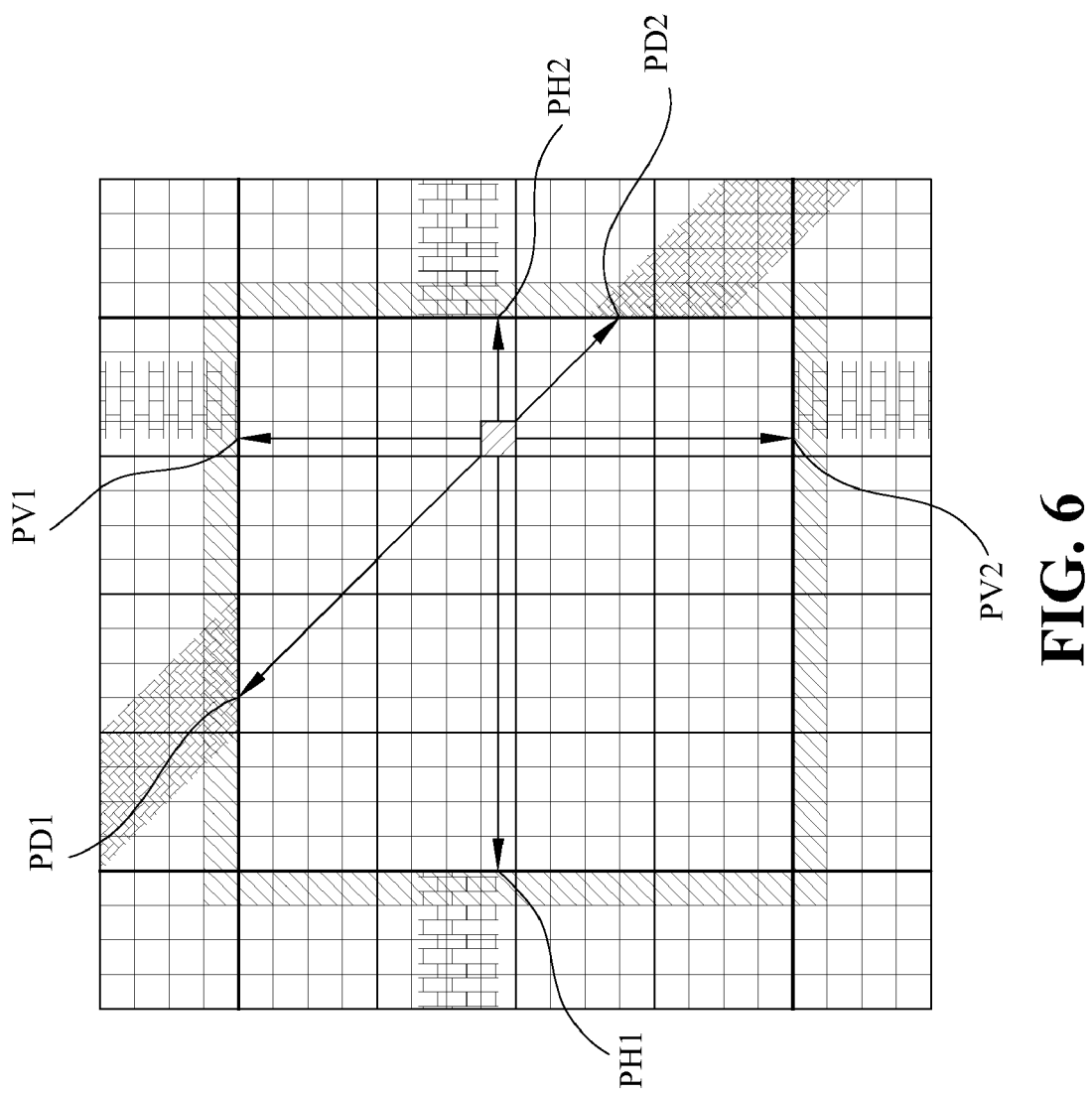
FIG. 6 is a schematic diagram illustrating a 3-directional weighting interpolation of the MDI method according to an embodiment of the present invention.

When the 4×4 reference block exhibits more than two strong edge directions, the damaged MB is considered as a multi-directional edge area. In this case, the damaged MB is recovered by calculating missing pixels of the damaged MB by interpolation according to the directivity of the 4×4 reference block. According to an aspect of the embodiment, the MDI method is a 3-directional weighted interpolation method, compensating along a horizontal direction, a vertical direction, and a 45° direction. FIG. 6 is a schematic diagram illustrating a 3-directional weighting interpolation of the MDI method according to an embodiment of the present invention. Referring to FIG. 6, the missing pixels P are recovered according to the two horizontal pixels PH1 and PH2 at the horizontal direction, the two vertical pixels PV1 and PV2 at the vertical direction, and the two diagonal pixels PD1 and PD2 at the diagonal direction. If the missing pixels P do not have a corresponding strong edge direction, the damaged MB can be interpolated along the same direction corresponding to that of the nearest missing pixel. In this concern, the MDI method is similar to the DI method.

When most 4×4 reference blocks exhibit more than two strong edge directions, while the direction threshold β is greater than the threshold determining value, the damaged MB is classified as a complex multi-directional edge area. If the damaged MB includes complex content, the BNM method may be an ideal one for reconstructing the block to achieve an optimal image quality. However, the BNM method also requires a very large amount of calculation and a very long calculation time. On another hand, although requiring for a smaller calculation amount, the BI method is adapted for maintaining to display an ordinary image quality only.

Correspondingly, the present invention further provides a fast MDI method, as to be specifically disclosed below.

Generally, the MDI method often spends 40% to 90% of calculation time in searching for possible directional angle and directional gradient. However, related directional data of the damaged MB of the transmitted image would have been recorded during the original coding process. As such, the recorded data contained in the original coding can be used for reducing the calculation amount and saving the calculation time. In H.264/AVC coding, there is a correlation between intro-predication modes and edge direction. For example, the coding modes of an eight directional 4×4 prediction modes and three directional 16×16 prediction modes can be used for pre-estimating for the edge direction of real images. Intra prediction information of the H.264/AVC contains data related to the original MB direction. As such, the fast MDI method of the present invention employs another fast estimation method, for determining whether to use the directional data of the damaged MB contained in the original coding, so as to execute a direct interpolation. In such a way, it can reduce the complexity of the process of edge direction detection by 70% to 95% on average, and thus drastically improving the decoding efficiency.

Figure 7:
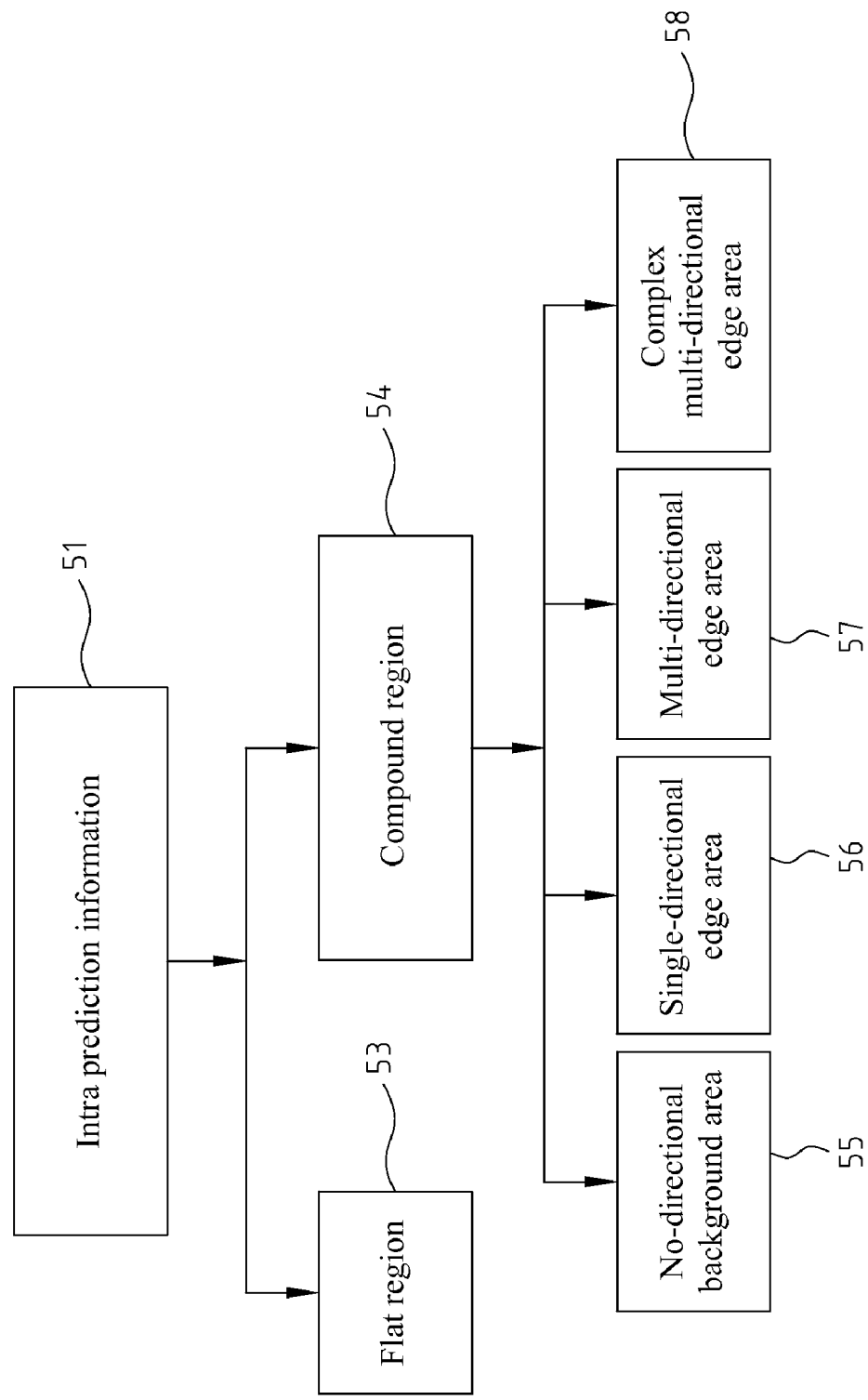
FIG. 7 is a flow chart illustrating a fast classification according to a fast SEC method of the present invention.

FIG. 7 is a flow chart illustrating a fast classification according to a fast SEC method of the present invention. Referring to FIG. 7, damaged MBs are classified into two categories, flat region 53 and compound region 54, according to the intra prediction mode information of the original coding. Damaged MBs in the flat region 53 are to be compensation processed by DI or BI method according to the intra prediction mode information, while damaged MBs in the compound region 54 are to be compensation processed by the aforementioned method.

With respect to the six neighbor blocks of each damaged MB (i.e., top, top-right, left, right, bottom, and bottom-left), there are at least five adjacent MBs chosen via 16×16 prediction mode. It does not need to use any Sobel operator to detect the edge direction for a smooth region of an image. On the contrary, each pixel of the damaged MBs can be interpolated along a single direction (e.g., vertical, horizontal, or diagonal) or bi-direction (vertical-horizontal) determined by majority decision based on the intra 16×16 prediction mode including mode 0 (vertical), mode 1 (horizontal), mode 3 (plane), and mode 2(DC), of corresponding surrounding MBs.

Figure 8:
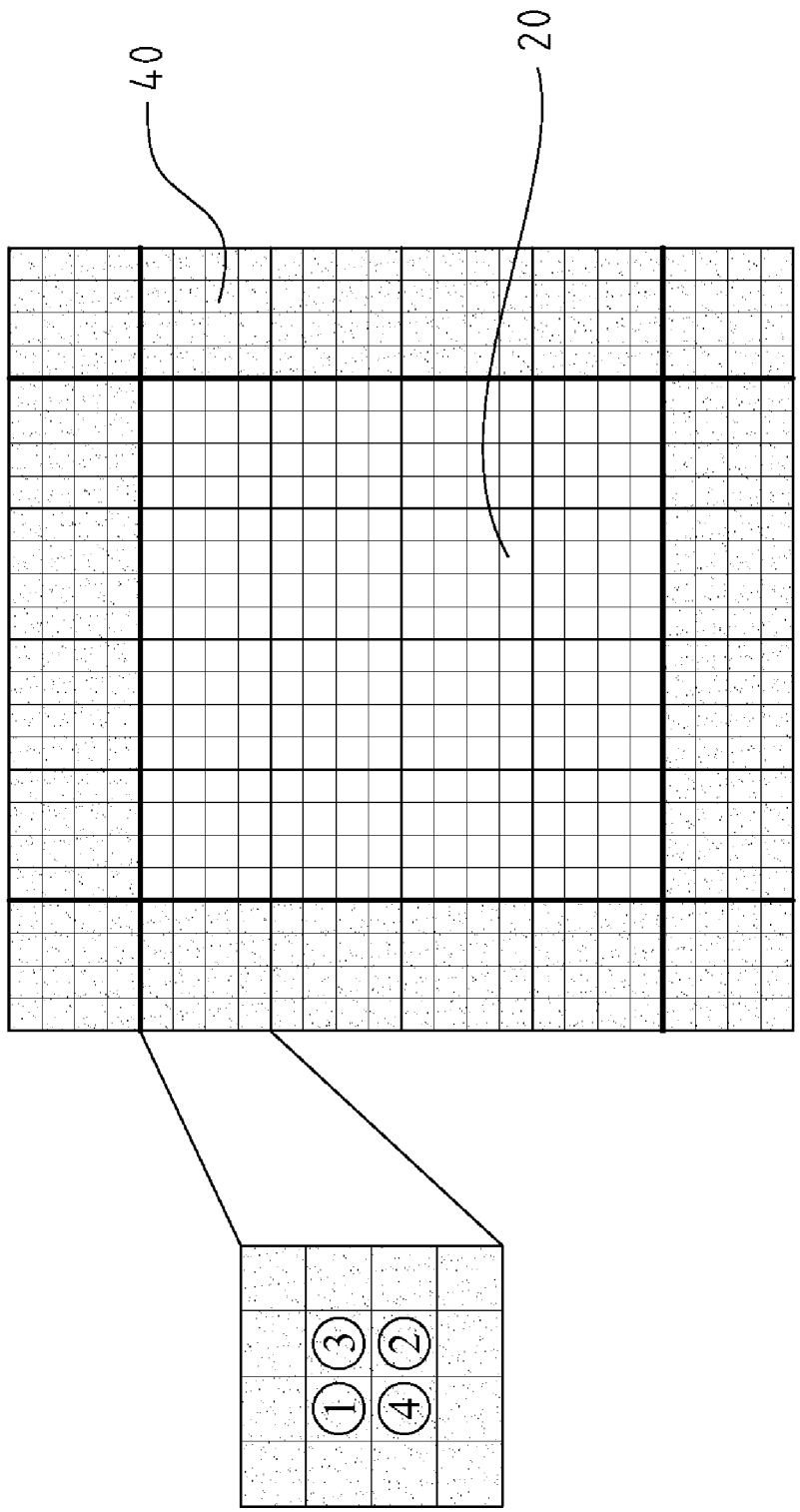
FIG. 8 is a schematic diagram illustrating a fast SEC method according to an embodiment of the present invention.

As to the compound region, in a 16×16 and 4×4 mixing prediction mode of the reference MBs, four-pixel-wide boundary is disjoined into 4×4-pixel blocks as shown in FIG. 8. For the purpose of ascertaining dominant edges of each 4×4-pixel block, the intra mode information and a small amount of the edge direction filters (i.e., Sobel filters) are employed). The calculation order of the Sobel filter to estimate the directional angles and directional gradients of an inner layer of pixels, p1, p2, p3, and p4, is depicted in FIG. 8. The calculation is stopped if a desired block is obtained. For each 4×4-pixel block, edge detection begins from p1 and p2. If at least one of p1 and p2 exhibits a strong edge in the same direction of the intra mode information, the block is determined as the desired block. If none of p1 and p2 exhibits a strong edge, p3 and p4 are further calculated. As to the intra DC prediction mode, the 4×4-pixel block is directly regarded as having no strong edge, and thus does not need a Sobel filter. The final stage is similar as the foregoing embodiment of SEC method of the present invention, in which the damaged MBs can be classified into four categories, including: no-directional background area 55, single-directional edge area 56, multi-directional edge area 57, and complex multi-directional edge area 58. Different categories are adapted for different interpolation methods. Specifically, the BI method is applied to the no-directional background area; the DI method is applied to the single-directional edge area; the BNM method is applied to the multi-directional edge area; and the MDI method is applied to the complex multi-directional edge area.

The experimental environment of the present invention is based upon the H.264 reference software of Joint Model (JM), provided by the JVT committee (Joint Video Team of ISO/IEC MPEG and ITU-T VCEG). Several standard video streams including CIF (352×288) and QCIF (176×144) are tested for evaluating the video quality. The high resolution video stream are encoded at 1 I-frame for every 12 P-frames with a slice size of 536 bytes, with random packet lost errors at different specified loss ratios (different rates) generated by a Flexible Macroblock Ordering (FMO) technique, which are assumed to be caused by transmission errors. Different random packet lost errors are used simultaneously at each different specified loss ratio.

The average peak signal-to-noise ratio (PSNR) of a video stream is employed to give a quantitative evaluation of the quality of the reconstructed image. In order to illustrate the performance of the SEC method of the present invention, the rates at which random packets are lost, in regard to their effect on intra-frames, are provided of approximately 1%, 2%, 4%, and 10%.

Figure 9:
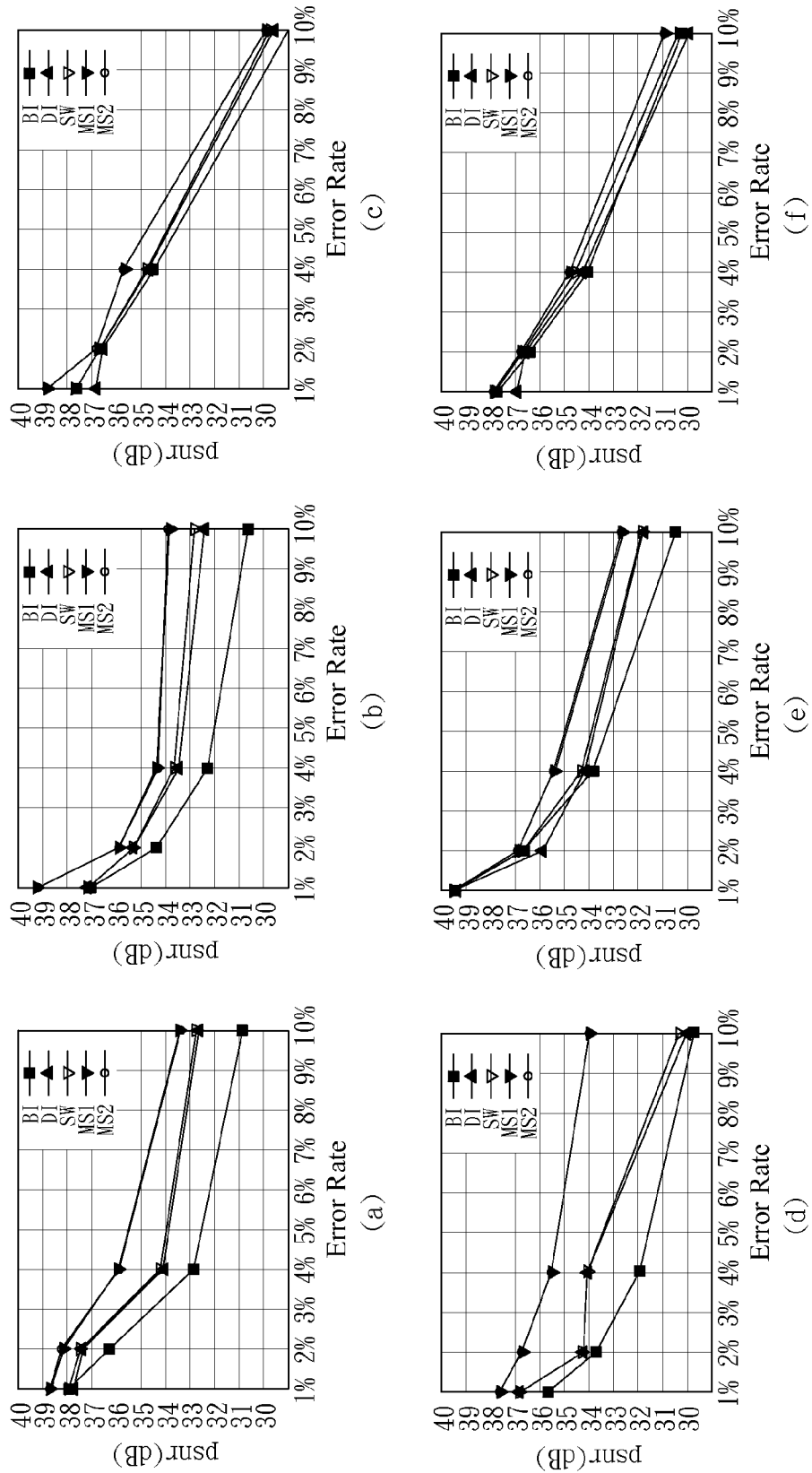
FIG. 9 shows PSNR diagrams of the SEC method of the present invention and the conventional technology, respectively.

FIG. 9 shows PSNR diagrams of the SEC method (SM1) of the present invention, the fast SEC method (SM2), and the conventional BI method, the conventional Di method, and the conventional switching SEC method (SW) which is adapted for dynamically switching between BI method and DI method (referring to Y. Xu and Y. Zhou, "H.264 video communication based refined error concealment schemes," IEEE Trans. Consum. Electron., vol. 50, no. 4, pp. 1135-1141, November 2004), respectively. As shown in FIG. 9, different PSNR curves describe different standard video streams with different packet error rates, respectively. For example, the standard video streams as shown in FIG. 9 include carphone (9*a*), Claire (9*b*), container (9*c*), foreman (9*d*), grandma (9*e*), and Stefan (9*f*).

As shown in FIG. 9, the SEC methods SM1 and SM2 of the present invention result in optimal performances in regard to the "foremand" video stream (e.g., having an error rate lower than 10%) which is significantly better than the BI method adopted by JM decoder for 4.16 dB and 4.22 dB, respectively, and is better than the DI method adopted by JM decoder for 3.84 dB and 3.9 dB, respectively, and is better than the switching SEC method for 3.56 dB and 3.62 dB.

Table 1 shows the speed-up factors of SEC methods SM1 and SM2 of the present invention in comparison to the SW SEC method. The speed-up factors are defined as calculation speed ratios. It can be learnt from table 1 that the SEC methods SM1 and SM2 of the present invention are adapted for significantly improve the calculation speed for up to 2.98 to 4.92 times.

TABLE 1

|  | Error Rate 1% | | Error Rate 4% | |
| --- | --- | --- | --- | --- |
|  | SM1 | SM2 | SM1 | SM2 |
| Container | 3.57 | 6.23 | 2.98 | 4.92 |
| Foreman | 3.52 | 4.85 | 3.02 | 4.24 |

As such, the SEC method and the fast SEC method according to the present invention are adapted to significantly accelerate the speed of recovering the image, and provide an efficient decoding scheme.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A spatial error concealment (SEC) method, for concealing a spatial image error of an image frame in a image transmission system caused by a damaged macroblock (MB), and the system comprises a processor, a video buffer, and a memory which stories image frames wherein the image frame comprises a plurality of MBs with each of the MBs comprising a plurality of pixels, and the damaged MB contains incorrect image content, the SEC method comprising:

loading the plurality of MBs from said memory into said video buffer, and performing the following steps with a processor:

selecting an edge reference pixel group constituted by a plurality of N-pixel-wide edge reference pixels surrounding the damaged MB stored in said video buffer;

partitioning the edge reference pixel group into a plurality of N×N-pixel edge reference blocks;

using a Sobel operator to calculating directional gradients and directional angles of the pixels of the edge reference blocks;

using a directional entropy calculation equation comprising a directional probability density function to calculate a directional entropy $H_d$ of the edge reference block according to the directional gradients and the directional angles of the pixels of the edge reference blocks;

using a direction threshold equation to calculate a direction threshold β of the edge reference blocks, according to the directional entropy $H_d$ of all of the edge reference blocks;

using a reference direction threshold to compare with the direction threshold of the edge reference blocks, and when the direction threshold is smaller than the reference direction threshold, adopting directions of the edge reference blocks, or otherwise determining the edge reference blocks as having no directivity;

classifying the edge reference blocks into four categories according to the direction threshold, comprising no-directional background area, single-directional edge area, multi-directional edge area, and complex multi-directional edge area;

using bi-linear interpolation (BI) method for compensation processing the no-directional background area, for obtaining image content of each pixel of the damaged MB;

using directional interpolation (DI) method for compensation processing the single-directional edge area, for obtaining image content of each pixel of the damaged MB;

using multi-directional interpolation (MDI) method for compensation processing the multi-directional edge area, for obtaining image content of each pixel of the damaged MB; and using a best neighborhood matching (BNM) method for compensation processing the complex multi-directional edge area, for obtaining image content of each pixel of the damaged MB, wherein the reference direction threshold is a real number ranging between 0.7 and 0.9.

2. The SEC method according to claim 1, wherein the N is a positive integer.

3. The SEC method according to claim 2, wherein the positive integer is 4.

4. The SEC method according to claim 1, wherein the directional entropy calculation equation is Hd=$-\Sigma$p(dx)log$_2$ p(dx), wherein p(dx) represents a directional probability density function of dx which is a directional factor comprising directional gradient.

5. The SEC method according to claim 1, wherein the direction threshold equation is $$\beta = \frac{-\sum p(d_x)\log_2 p(d_x)}{\text{Max}(H_d)},$$

wherein Max(Hd) represents a maximum value of Hd.

6. A spatial error concealment (SEC) method, for concealing a spatial image error of an image frame in a image transmission system caused by a damaged macroblock (MB), and the system comprises a processor, a video buffer, and a memory which stories image frames wherein the image frame comprises a plurality of MBs and each of the MBs comprises a plurality of pixels, and the damaged MB contains incorrect image content, while the image content of the image frame has been previously processed by an coding algorithm of H.264 standard, the SEC method comprising:

loading the plurality of MBs from said memory into said video buffer, and performing the following steps with a processor:

selecting an edge reference pixel group constituted by a plurality of N-pixel-wide edge reference pixels surrounding the damaged MB stored in said video buffer;

partitioning the edge reference pixel group into a plurality of N×N-pixel edge reference blocks;

using an intra prediction information of the H.264 to execute a direct interpolation for compensation along a single direction or a bi-direction to an edge reference block classified as a flat region according to the H.264 standard, without using a Sobel operator for determining direction;

using the intra prediction information of the H.264 to execute an direction calculation to a 2×2 pixel of a center area of an edge reference block classified as a compound region, wherein two pixels at diagonal positions are calculated first, and if the two pixels at diagonal positions exhibit directions, then selecting the directions to execute interpolation for compensation without calculation the rest two pixels; and if the two pixels at diagonal positions do not exhibit directions, calculating the rest two pixels, so as to classify the edge reference blocks into four categories comprising no-directional background area, single-directional edge area, multi-directional edge area, and complex multi-directional edge area;

using bi-linear interpolation (BI) method for compensation processing the no-directional background area, for obtaining image content of each pixel of the damaged MB;

using directional interpolation (DI) method for compensation processing the single-directional edge area, for obtaining image content of each pixel of the damaged MB;

using multi-directional interpolation (MDI) method for compensation processing the multi-directional edge area, for obtaining image content of each pixel of the damaged MB; and using best neighborhood matching (BNM) method for compensation processing the complex multi-directional edge area, for obtaining image content of each pixel of the damaged MB, wherein the reference direction threshold is a real number ranging between 0.7 and 0.9.

7. The SEC method according to claim 6, wherein the N is a positive integer.

8. The SEC method according to claim 7, wherein the positive integer is 4.

9. The SEC method according to claim 6, wherein the directional entropy calculation equation is Hd=$-\Sigma$p(dx)log$_2$ p(dx), wherein p(dx) represents a directional probability density function of dx which is a directional factor comprising directional gradient.

10. The SEC method according to claim 6, wherein the direction threshold equation is $$\beta = \frac{-\sum p(d_x)\log_2 p(d_x)}{\text{Max}(H_d)},$$

wherein Max(Hd) represents a maximum value of Hd.

* * * * *